(12) United States Patent
Schroeder

(10) Patent No.: US 10,444,106 B2
(45) Date of Patent: Oct. 15, 2019

(54) BALANCING METHOD FOR BALANCING AT HIGH SPEED A ROTOR OF A ROTARY MACHINE

(71) Applicant: SKF Magnetic Mechatronics, Saint-Marcel (FR)

(72) Inventor: Ulrich Schroeder, Mont-Saint-Aignan (FR)

(73) Assignee: SKF Magnetic Mechatronics, Saint-Marcel (FR)

(*) Notice: Subject to any disclaimer, the term of this patent is extended or adjusted under 35 U.S.C. 154(b) by 278 days.

(21) Appl. No.: 15/349,312

(22) Filed: Nov. 11, 2016

(65) Prior Publication Data
US 2017/0167943 A1  Jun. 15, 2017

(30) Foreign Application Priority Data
Dec. 10, 2015  (EP) .................................. 15306970

(51) Int. Cl.
*G01R 31/28* (2006.01)
*G01M 1/32* (2006.01)
(Continued)

(52) U.S. Cl.
CPC .............. *G01M 1/32* (2013.01); *F16C 32/048* (2013.01); *F16C 32/0446* (2013.01); *H02K 7/04* (2013.01);
(Continued)

(58) Field of Classification Search
CPC ............... F16C 32/0446; F16C 32/048; F16C 2380/28; H02K 7/09; H02K 7/04;
(Continued)

(56) References Cited

U.S. PATENT DOCUMENTS 6,580,186 B1 * 6/2003 Suzuki ............... F16C 17/026
310/51
2014/0360006 A1 * 12/2014 Zhang ............... F04D 29/058
29/593

FOREIGN PATENT DOCUMENTS

CN      1306332 A    8/2001
CN    101040178 A    9/2007
(Continued)

OTHER PUBLICATIONS

Naohiko Takahashi et al: "S-02 （Registration No. 2002IS002 ） ISO Standardization for Active Magnetic Bearing Technology", Mar. 1, 2005.
(Continued)

*Primary Examiner* — Thiem D Phan
(74) *Attorney, Agent, or Firm* — Bryan Peckjian; SKF USA Inc. Patent Dept.

(57) ABSTRACT

A balancing method for balancing at high speed a flexible rotor of a rotary machine, the rotary machine having a stator, and the rotor being supported in the stator by at least two radial magnetic bearings. The balancing method including a step of placing the rotor inside the stator, a step of performing at least one first run in order to identify amplitude and angular location of the unbalance in a first speed range below critical speed, a step of placing first balancing masses inside the rotor on predefined first balancing planes, a step of performing at least one second run in order to identify amplitude and angular location of the unbalance in a second speed range above critical speed, and a step of placing second balancing masses inside the rotor on predefined second balancing planes.

12 Claims, 3 Drawing Sheets

(51) Int. Cl.
  *H02K 7/04* (2006.01)
  *H02K 7/09* (2006.01)
  *H02K 15/16* (2006.01)
  *F16C 32/04* (2006.01)
(52) U.S. Cl.
  CPC ............. *H02K 7/09* (2013.01); *H02K 15/165* (2013.01); *F16C 2380/28* (2013.01); *Y10T 29/49004* (2015.01)
(58) Field of Classification Search
  CPC ...... H02K 15/165; H02K 11/20; H02K 29/14; G01M 1/32; Y10T 29/49004
  USPC ................ 29/598, 593, 596, 603.09, 603.13; 73/468, 66; 416/144
  See application file for complete search history.

(56) References Cited

FOREIGN PATENT DOCUMENTS

| CN | 102425561 A | 4/2012 |
|---|---|---|
| CN | 104165729 A | 11/2014 |

OTHER PUBLICATIONS

Ird Balancing et al: "IRD Balancing Technical Paper 1 World's Leading Supplier of Soft Bearing Balancing Machines & Instruments Balance Quality Requirements of Rigid Rotors", Mar. 1, 2009.

* cited by examiner

BALANCING METHOD FOR BALANCING AT HIGH SPEED A ROTOR OF A ROTARY MACHINE

CROSS REFERENCE TO RELATED APPLICATIONS

This application claims priority to European patent application no. 15306970.3 filed on Dec. 10, 2015, the contents of which are fully incorporated herein by reference.

FIELD OF THE INVENTION

The present invention relates to the field of rotary machines comprising magnetic bearings for supporting the weight and load of a rotor of the rotary machine by active magnetic bearings thanks to magnetic fields. In particular, the invention relates to a balancing method for balancing a magnetically suspended rotor system.

BACKGROUND OF THE INVENTION

It is known to provide axial and radial magnetic bearings in rotary machines having a vertical or horizontal rotor arrangement and to provide auxiliary mechanical bearings supporting the rotor in case of failure of the magnetic bearings, for example if the magnetic bearings are overloaded or if the electrical or electronic control system fails.

It is necessary to correctly balance the rotor of a rotary machine. Indeed, without correct balancing of the rotor, the rotary machine will not pass critical rotational speeds without contacting the auxiliary bearings.

It is known to balance the rotor of a rotary machine on a balancing facility.

In the case of a "rigid" rotor, there would be no rotor deformation due to unbalance forces increasing with speed. For a rigid rotor, the balancing can be performed at low speed, using a classical balancing facility.

The invention relates more to rotors having a "flexible" structure. In case of a rotor with a flexible structure and according to the rotor structure, there will be a deformation due to the unbalance forces increasing with speed. A flexible rotor which is operated above close to critical speeds must be rotated and balanced close to these critical speeds and above these critical speeds, close to the final speed.

High speed balancing facilities for such "critical", flexible rotors are particularly expensive and necessitate many trial runs and the use of plurality of sensors. Furthermore, rotating a rotor of large diameter at very high speed on known balancing facilities can be particularly dangerous if the rotor is not correctly balanced.

Finally, vacuum is needed for such balancing facilities, which increases the costs of the balancing.

One aim of the present invention is to provide a balancing method adapted to balance at high speed a flexible rotor of a rotary machine directly when the rotor is mounted inside the rotary machine, without using a specific balancing facility.

BRIEF SUMMARY OF THE INVENTION

It is a particular object of the present invention to provide a balancing method for balancing at high speed a rotor of a rotary machine comprising a stator, a rotor having a rotational axis and supported in the stator by at least two radial magnetic bearings, and an energy storage cylinder secured to the rotor shafts. The stator provides a casing having an opened end and a top cover adapted to close the opened end of the casing.

The balancing method provides a step of placing the rotor inside the stator, a step of performing at least one first run in order to identify amplitude and angular location of the unbalance in a first speed range, a step of placing a first set of balancing masses inside the rotor on predefined first balancing planes, a step of performing at least one second run in order to pass critical speeds and identify amplitude and angular location of the unbalance in a second speed range, and a step of placing second balancing masses inside the rotor on predefined second balancing planes.

In one embodiment, the step of performing at least one first run provides a step of rotating the rotor until a first threshold, a step of switching the radial magnetic bearings to a synchronous force rejection mode, a step of rotating the rotor until a second threshold in synchronous force rejection mode, and a step of identifying amplitude and angular location of the unbalance in a second speed range provided between the first and second threshold, according to information received from an electronic control device controlling the magnetic bearings.

By "switching the radial magnetic bearings to a synchronous force rejection mode", it should be understood that the radial magnetic bearings are switched in a way that the rotor rotates without force around its inertia axis.

The balancing method further provides a step of removing the top cover and of placing first balancing masses inside the rotor against the inner cylindrical surface of the rotor. The first balancing masses are disposed on predefined first balancing planes given by the rotor model and a step of closing the upper part of the stator casing by the top cover.

The step of performing at least one first run provides a step of rotating the rotor until a first threshold, a step of switching the radial magnetic bearings to the synchronous force rejection mode, a step of rotating the rotor until a second threshold in synchronous force rejection mode, a step of activating an active resonance damping mode of the radial magnetic bearings, a step of rotating the rotor until a third threshold in active resonance damping mode, a step of switching the radial magnetic bearings to synchronous force rejection mode, a step of rotating the rotor until a fourth threshold in synchronous force rejection mode, and a step of identifying amplitude and angular location of the unbalance in a fourth speed range R4 provided between the third and fourth thresholds, according to information received from an electronic control device controlling the magnetic bearings.

By "switching the radial magnetic bearings to an active resonance damping mode", it should be understood that the radial magnetic bearings are switched in a way that the rotor rotates with the force generated by the radial magnetic bearings.

The balancing method further provides a step of removing the top cover and of placing second balancing masses inside the rotor against the inner cylindrical surface of the rotor, the second balancing masses being disposed on predefined second balancing planes determined by the flexible rotor model.

In one embodiment, each balancing mass is made of two individual masses located in opposition position on the inner circumference of the rotor on one balancing plane.

In one embodiment, each balancing mass has an annular shape.

In one embodiment, the balancing masses are made from metal material.

In one embodiment, the balancing masses are fixed on the inner surface of the rotor by gluing.

In one embodiment, the balancing masses are made in magnetic material.

The first threshold is, for example, provided between 80 Hz and 120 Hz, such as for example 100 Hz, the second threshold is, for example, provided between 150 Hz and 200 Hz, such as for example 160 Hz, the third threshold is, for example, provided between 250 Hz and 350 Hz, such as for example 300 Hz and the fourth threshold is, for example provided between 500 Hz and 1000 Hz, such as for example 750 Hz.

In one embodiment, the rotor provides an upper and a lower shaft.

The first run is, for example, configured to balance the upper shaft of the rotor and the second run is, for example, configured to balance the lower shaft of the rotor.

As an example, two balancing planes are associated with each rotor shaft.

BRIEF DESCRIPTION OF THE SEVERAL VIEWS OF THE DRAWING

The present invention and its advantages will be better understood by studying the detailed description of specific embodiments given by way of non-limiting examples and illustrated by the appended drawings on which.

DETAILED DESCRIPTION OF THE INVENTION

Figure 1:
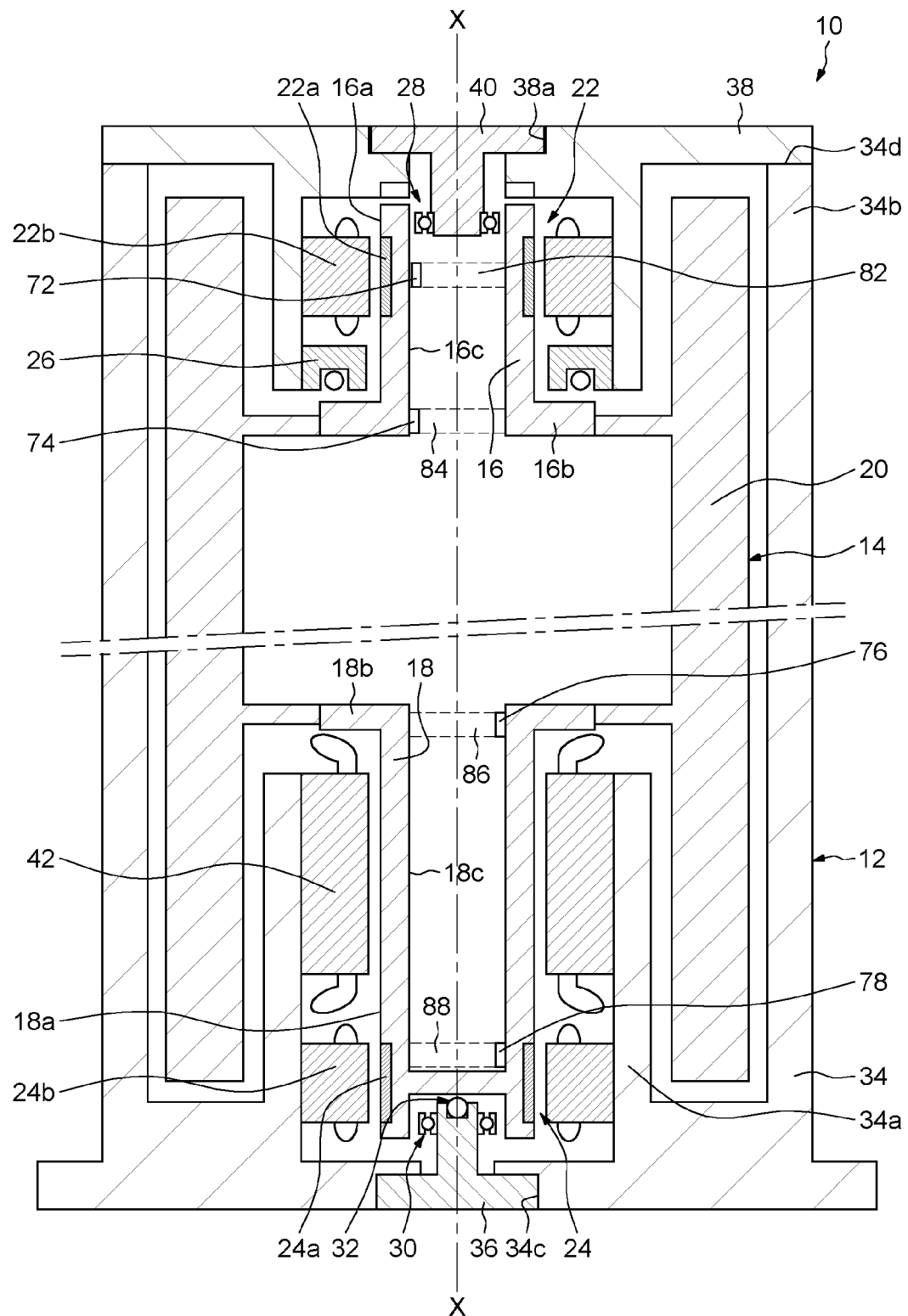
FIG. 1 is an axial half-section view of a rotary machine having a rotor adapted to be balanced thanks to the balancing method according to the present invention.

A rotary machine 10 is illustrated on FIG. 1; the rotary machine 10 may for example be a high speed flywheel for energy storage, or any high speed rotary machine having a vertical rotor arrangement.

The rotary machine 10 provides a stator 12 and a rotor 14 having an upper shaft 16 and a lower shaft 18 rotating around a vertical axis X-X. An energy storage cylinder 20 is secured in a flexible way to the shafts 16, 18 of the rotor 14.

The energy storage cylinder 20 is adapted to rotate at very high speed in vacuum, such as up to 50 000 rpm.

The upper and lower shafts 16, 18 of the rotor 14 are supported rotatably with respect to the stator 12 by an active magnetic bearing system comprising two radial magnetic bearings 22, 24, respectively an upper radial magnetic bearing 22 and a lower radial magnetic bearing 24, and by an axial actuator 26 secured to the stator 12 and configured to produce an axial attractive force on the upper shaft 16 of the rotor 14.

The two radial magnetic bearings 22, 24 may be identical and arranged at opposite ends of the rotor 14. The two radial magnetic bearings 22, 24 provide a plurality of sensors (not shown) and are controlled by an electronic control unit (not shown) adapted to receive information from the sensors.

The upper and lower shafts 16, 18 of the rotor 14 are further supported rotatably with respect to the stator 12 by an upper radial touch down bearing 28 and by lower radial and axial touch down bearings 30, 32. The touch down bearings are, for example, mechanical auxiliary bearings adapted to support the rotor in case of failure of the magnetic bearings.

Each radial magnetic bearing 22, 24 provides an annular armature 22a, 24a made of ferromagnetic material mounted on an outer cylindrical surface 16a, 18a of the rotor shafts 16, 18 and a stator armature 22b, 24b secured to the stator 12. The stator armatures 22b, 24b each provides, in a conventional manner, a stator magnetic circuit having one or more annular coils and ferromagnetic body and are placed facing the rotor armature 22a, 24a so as to define a radial airgap. The details of the stator armatures are not shown on the Figures. Thanks to the active magnetic bearing system, the rotor 14 rotates without mechanical contact within the stator 12.

As illustrated on FIG. 1, each rotor shafts 16, 18 are hollowed and provided at one end with a shoulder 16b, 18b projecting radially towards the stator 12.

The stator 12 provides a casing 34 surrounding the rotor 14 formed by the energy storage cylinder 20, the upper shaft 16 and the lower shaft 18. As illustrated on FIG. 1, the casing 34 provides a lower part 34a housing the lower shaft 18 of the rotor 14 and an upper part 34b housing the upper shaft 16 of the rotor 14. The lower part 34a is provided with a lower opening 34c adapted to receive a lower holder 36 for the lower radial and axial touch down bearings 30, 32. The upper part 34b is axially opened in order to mount the rotor shafts 16, 18 with the energy storage cylinder 20 inside the stator 12. The stator further provides a top cover 38 adapted to axially close the opened end 34d of the upper part 34b of the stator 12. The top cover 38 is provided with an upper opening 38a adapted to receive an upper holder 40 for the upper radial touch down bearing 28. The top cover 38, the upper holder 40 and the lower holder 36 are mounted removable on the casing 12.

As illustrated, the axial actuator 26 is secured to the upper part 34b of the casing and is configured to produce an axial attractive force on the shoulder 16b of the upper shaft 16 of the rotor 14.

The upper magnetic bearing 22, the axial actuator 26 and the upper holder 40 are secured to the top cover 38, so that after removing the top cover 38, the rotor 14 can be pulled out easily.

As illustrated, the stator of a motor/generator 42 is secured to the lower part 32a of the stator, facing the lower shaft 18 of the rotor 14.

The upper and lower shafts 16, 18 of the rotor 14 are made from magnetic steel. The storage cylinder 20 can be made from carbon fibers or metal material, such as for example steel.

The energy storage cylinder 20 is flexibly connected to the shaft shoulders 16b, 18b. Thanks to the flexible connection between the storage cylinder 20 and the rotor shafts 16, 18, the shafts bending frequencies and the critical speeds are low, which reduces the necessary magnetic bearing power to pass critical speeds.

Figure 2:
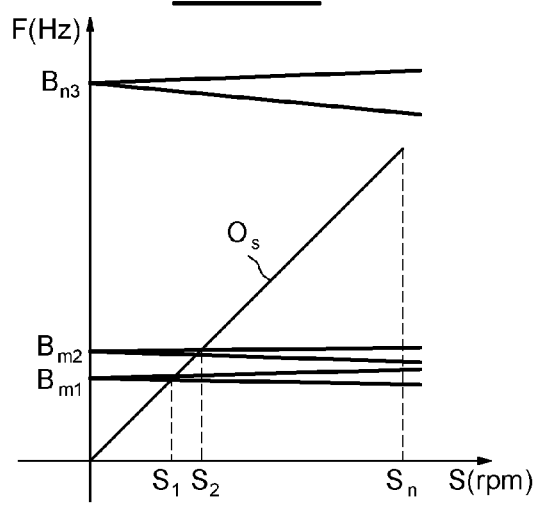
FIG. 2 shows a Campbell diagram of the rotor of FIG. 1, illustrating the frequency, in Hz, versus the speed, in rpm.

The Campbell diagram shown on FIG. 2 illustrates the resonance frequencies F versus the rotational speed S of the rotor 14 of the rotary machine 10. The evolution of the natural frequencies corresponding to a mode is drawn in function of the rotational speed of the rotor.

As illustrated on FIG. 2, the rotary machine is operated at an operation nominal speed Sn above the upper and lower shafts bending mode frequencies Bm1, Bm2 and below but close to the storage cylinder bending mode frequency Bm3. The upper and lower shafts bending mode frequencies Bm1, Bm2 are around 180 Hz, while the maximum operation speed Sn of the rotary machine can be, for example, of 750 Hz. The storage cylinder bending mode frequency Bm3 is around 1000 Hz.

The critical speeds S1, S2 are crossed when the operation speed line OS of the rotary machine crosses the line of the upper and lower shafts bending mode frequencies Bm1, Bm2, in the region between 180 Hz and 10 800 rpm. Once the critical speeds S1, S2 are crossed, the rotary machine 10 can operate without crossing any more critical speeds. However, at high speed, when the speed is approaching the storage cylinder bending mode, the shaft runout could increase again. This runout increase can for example be caused by a not perfect attachment between shaft and cylinder. Such runout increase can be minimized by placing balancing mass at a predefined balancing plane close to the shaft attachment area.

The correct balancing of such rotary machine is thus mandatory to pass the critical speeds of the rotor shafts with low runout and vibration level. The correct balancing of such rotary machine is also mandatory to rotate the rotary machine at an operation nominal speed Sn close to the cylinder bending mode frequency Bm3.

Figure 3:
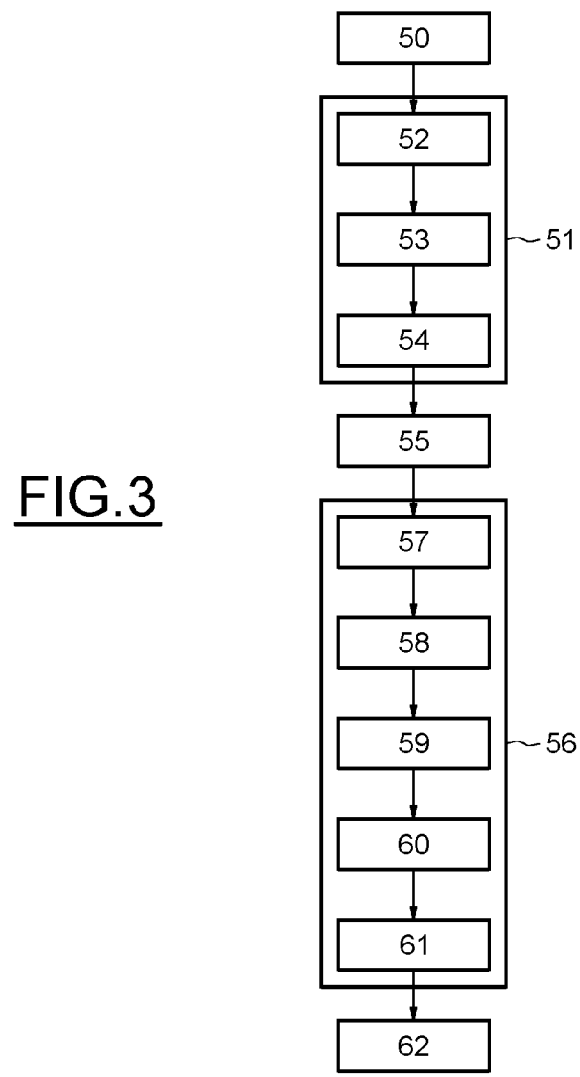
FIG. 3 illustrates a flow diagram of the balancing method according to the present invention.

The balancing method according to the present invention will be described in reference to the flow diagram illustrated on FIG. 3 and to the diagrams illustrated on FIGS. 4 and 5.

In a first step 50, the rotor 14, comprising the shafts 16, 18 and the energy storage cylinder 20, is placed inside the rotary machine 10, through the aperture of the upper part 34b of the stator casing 34. In a non-limiting way, the rotor 14 can be previously pre-balanced at low speed in a common balancing facility. The aim of the balancing method according to the present invention is to identify and compensate possible unbalance at different locations of the flexible rotor structure and which can only be identified when rotating at high speed.

In a second step 51, one first run of the rotor is performed.

The first run provides a step 52 of rotation the rotor in levitation on the magnetic bearings 22, 24 until the first threshold F1, for example 100 Hz. In a first speed range R1, for example provides between 0 Hz and 100 Hz, the magnetic bearings 22, 24 control the rotation of the rotor shafts around the rotational axis X-X.

The first run further provides a step 53 of switching the radial magnetic bearings to synchronous force rejection mode the rotor thus rotates without force around its inertia axis until a second threshold F2, for example 160 Hz. In the second speed range R2, for example between F1=100 Hz and F2=160 Hz, the magnetic bearings 22, 24 are active but do not generate any synchronous force and the rotor rotates around its inertia axis.

Figure 4:
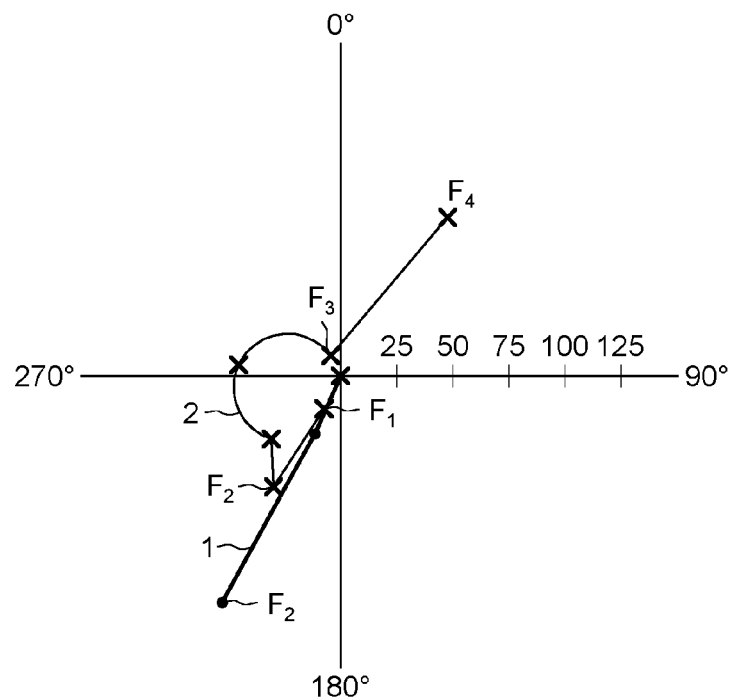
FIG. 4 shows a diagram illustrating the vector trajectory of the runout of the geometrical axis in rotor coordinates.

As a typical example, the runout vector trajectory in rotor coordinates in speed range R2 is shown by curve 1 in FIG. 4. FIG. 5 shows the corresponding runout amplitude evolution. In the speed range R2 the runout trajectory is a straight line between F1 and F2. The angular location and the amplitude of the unbalance responsible for the runout increase in speed range R2 can be deduced from curve 1 in FIG. 4. Curve 1 shows the runout behavior with unbalanced rotor. FIGS. 4 and 5 show the typical runout evolution for the upper or lower radial bearing. However, the described unbalance identification method is about the same for the upper or the lower bearing.

The amplitude and the angular location of the unbalance responsible for the runout increase in the second and third speed range R2 and R3 are identified, in step 54, by using information received from the electronic control device controlling the magnetic bearings.

In step 55, the top cover 38 is removed and balancing masses are placed inside the rotor shafts.

A set of upper balancing masses 72, 74 are placed inside the rotor upper shaft 16, against the inner cylindrical surface 16c of the rotor upper shaft 16. The upper balancing masses 72, 74 are disposed on predefined upper balancing planes 82, 84 depending on the type of rotor. In a similar way, a set of lower balancing masses 76, 78 are placed inside the rotor lower shaft 18, against the inner cylindrical surface 18c of the rotor lower shaft 18. The lower balancing masses are disposed on predefined lower balancing planes 84, 86 depending on the type of rotor.

As illustrated on FIG. 1, there are two upper predefined balancing planes 82, 84 associated with the upper shaft 16. However, the number and the location of balancing planes are predefined in a cartography as a function of the rotor type used. A first predefined upper balancing plane 82 is located radially between the upper magnetic bearing 22. The first upper balancing mass 72 located on the first upper predefined balancing plane 82 allows compensating the unbalance at the end of the upper shaft 16. A second predefined upper balancing plane 84 is located radially between the shoulders 16b of the upper shaft 16. The second upper balancing mass 74 located on the second predefined upper balancing plane 84 allows compensating unbalance and eventually concentricity error between the upper rotor shaft 16 and the energy storage cylinder 20.

After the upper and lower balancing masses 72, 74, 76 and 78 have been placed inside the rotor, the upper part of the stator casing is closed by the top cover 38 and a second run of the rotor can be performed at step 56.

The second run provides a step 57 of rotating the rotor in levitation on the magnetic bearings 22, 24 until the first threshold F1, for example 100 Hz. In the first speed range R1, for example provided between 0 Hz and 100 Hz, the magnetic bearings 22, 24 control the rotation of the rotor shafts around the rotational axis X-X.

The second run further provides a step 58 of switching the active magnetic bearing to synchronous force rejection mode the rotor thus rotates around its inertia axis until the second threshold F2, for example 160 Hz. In a second speed range R2, for example provided between 100 Hz and 160 Hz, the magnetic bearings are active but do not generate any synchronous force and the rotor rotates around its inertia axis.

At step 59, the magnetic bearings 22, 24 operate in active synchronous damping mode in order to pass the critical speeds. The rotor 14 is rotated in active synchronous damping mode until a third threshold F3, for example 300 Hz. In a third speed range R3, for example provided between 160 Hz and 300 Hz, the magnetic bearings control the rotation of the rotor shafts around the rotational axis X-X and provide active damping of the rotor modes.

At step 60, above F3, the magnetic bearings 22, 24 are switched from active synchronous damping mode to synchronous force rejection mode, the rotor thus rotates around its inertia axis until a fourth threshold F4, for example 750 Hz. In a fourth speed range R4, for example provides between 300 Hz and 750 Hz, the magnetic bearings are active but do not generate any synchronous force and the rotor rotates without force around its inertia axis.

Figure 5:
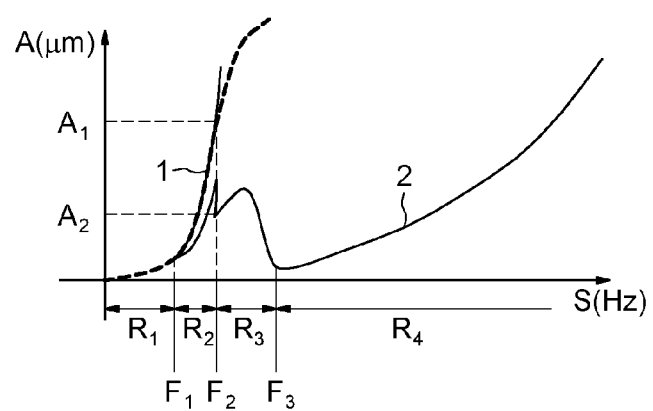
FIG. 5 shows a diagram illustrating the runout of the geometrical axis, in μm, as a function of the rotation speed of the rotor, in Hz.

The typical runout vector trajectory in rotor coordinates for compensated unbalance is shown by curve 2 in FIGS. 4 and 5. Curve 2 shows the runout behavior with compensated unbalance.

The amplitude and the angular location of the unbalance responsible for the runout increase in the fourth speed range R4 are identified, in step 61, by using information received from the electronic control device controlling the magnetic bearings. If necessary, the unbalance can be compensated by placing mass at the balancing planes 84, 86.

In step 62, if necessary, the unbalance responsible for the runout increase in speed range R4 can be compensated. The top cover 38 is removed and balancing masses 74, 76 are placed inside the rotor shafts.

As illustrated on FIG. 1, there are two predefined lower balancing planes 86, 88 associated with the lower shaft 18 and two predefined upper balancing planes 82, 84 associated with the upper shaft 16. However, the number and the location of lower and upper balancing planes are defined in a cartography as a function of the rotor type used.

Each balancing mass 72, 74, 76 and 78 can be made of one or more individual masses located on the inner circumference of the rotor shafts, such as for example two masses disposed in opposition position on one balancing plane. Each balancing mass 72, 74, 76 and 78 can have for example a parallelepiped shape, and can weight, for example several g, such as 2g. As an alternative, each balancing mass 72, 74, 76 and 78 can have an annular shape. The balancing mass 72, 74, 76 and 78 are made from metal material and are fixed on the inner surface 16c, 18c of the rotor shafts by any way, such as for example gluing. The balancing mass 72, 74, 76 and 78 can be magnets made from magnetic steel. In case balancing mass 72, 74, 76 and 78 are magnets, no fixing means, such as for example glue, are necessary. Furthermore, when rotating the rotor shafts, the centrifugal force press the balancing masses 72, 74, 76 and 78 against the inner surface 16c, 18c of the rotor shafts 16, 18.

The balancing masses can be introduced from the top of the stator using an appropriate tool.

The first threshold F1 is, for example, provided between 80 Hz and 120 Hz, such as for example 100 Hz. The second threshold F2 is, for example, provided between 150 Hz and 200 Hz, such as for example 160 Hz. The third threshold F3 is, for example, provided between 250 Hz and 350 Hz, such as for example 300 Hz and the fourth threshold F4 is, for example provided between 600 Hz and 1000 Hz, such as for example 750 Hz.

The balancing method is described as comprising a first run and a second run. However, the balancing method could provide a plurality of first run and a plurality of second run in order to have a rotor almost perfectly balanced.

The balancing method according to the invention uses the rotor unbalance information generated by the magnetic bearings, given in rotor coordinates. The number of balancing masses needed and the place where to place the balancing masses inside the rotor is then calculated according to the model of the flexible rotor structure.

Thanks to the present invention, the rotor is balanced directly inside the rotary machine. The balancing method described above is able to determine the exact location of the unbalance of the rotor by using information generated by the magnetic bearings given in rotor coordinates, and to correct the unbalance by simply opening the stator and placing balancing masses inside the rotor.

There is thus no need to use expensive high speed balancing facilities under vacuum, and no need to pull out the rotor for or during balancing.

The balancing method according to the present invention allows fast and accurate balancing, and decreases balancing time and costs.

The invention claimed is:

1. A balancing method for balancing at high speed a rotor of a rotary machine comprising:
   providing a stator and a rotor having a rotational axis and supported in the stator by at least two radial magnetic bearings, the stator including a casing having an opened end and a top cover adapted to close the opened end of the casing,
   placing the rotor in the casing of the stator,
   performing at least one first run, in which the rotor is rotated on until a first threshold, the magnetic bearings are operated in a synchronous force rejection mode, the rotor is rotated until a second threshold, and amplitude and an angular location of an unbalance in a speed range provided between the first and second threshold is identified, according to information received from an electronic control device controlling the magnetic bearings,
   removing the top cover and of placing first balancing masses inside the rotor against the inner cylindrical surface of the rotor, the first balancing masses being disposed on predefined first balancing planes defined in a cartography associated on the type of rotor,
   closing the upper part of the stator casing by the top cover,
   performing at least one second run, in which the rotor is rotated until the first threshold, the radial magnetic bearings are switched to the synchronous force rejection mode, the rotor is rotated in the synchronous force rejection mode until a second threshold, the radial magnetic bearings are switched to an active resonance damping mode, the rotor is rotated until a third threshold in resonance damping mode, the radial magnetic bearings are switched to a synchronous force rejection mode, the rotor is rotated until a fourth threshold in synchronous force rejection mode, and amplitude and the angular location of the unbalance in a fourth speed range comprised between the third and fourth thresholds is identified, according to information received from an electronic control device controlling the magnetic bearings, and
   removing the top cover and placing second balancing masses inside the rotor against the inner cylindrical surface of the rotor, the second balancing masses being disposed on predefined second balancing planes defined in a cartography associated on the type of rotor, wherein each of the first balancing masses and each of the second balancing masses has an annular shape.

2. The balancing method according to claim 1, wherein each balancing mass is made of two individual masses located in opposition position on the inner circumference of the rotor on one balancing plane.

3. The balancing method according to claim 1, wherein the balancing masses are made from metal material.

4. The balancing method according to claim 1, wherein the balancing masses are fixed on the inner surface of the rotor by gluing.

5. The balancing method according to claim 1, wherein the balancing masses are made in magnetic material.

6. The balancing method according to claim 1, wherein the range of the first threshold is between 80 Hz and 120 Hz.

7. The balancing method according to claim 1, wherein the range of the second threshold is between 150 Hz and 200 Hz.

8. The balancing method according to claim 1, wherein the range of the third threshold is between 250 Hz and 350 Hz.

9. The balancing method according to claim 1, wherein the range of the fourth threshold is between 600 Hz and 1000 Hz.

10. The balancing method according to claim 1, wherein the rotor comprises an upper and a lower shaft.

11. The balancing method according to claim 10, wherein the first run being configured to balance the upper shaft of the rotor and the second run being configured to balance the lower shaft of the rotor.

12. The balancing method according to claim 10, wherein two balancing planes are associated with each rotor shaft.

* * * * *